United States Patent [19]

Klepsch

[11] Patent Number: 4,731,213
[45] Date of Patent: Mar. 15, 1988

[54] METHOD OF PRODUCING COMPOSITE BOARDS OR LAMINATES

[75] Inventor: Wilhelm Klepsch, Kaprun, Austria

[73] Assignee: Senoplast Klepsch & Co., Austria

[21] Appl. No.: 833,891

[22] Filed: Feb. 26, 1986

[30] Foreign Application Priority Data

Nov. 14, 1985 [AT] Austria .............................. A3315/85

[51] Int. Cl.⁴ .............................................. B29C 49/22
[52] U.S. Cl. .................................... 264/512; 264/514; 264/171; 264/322; 425/133.5; 425/462
[58] Field of Search ............... 264/171, 512, 510, 511, 264/322, 294, 514; 425/131.1, 133.5, 462, 376 A

[56] References Cited

U.S. PATENT DOCUMENTS

| | | | |
|---|---|---|---|
| 3,480,998 | 12/1969 | Von Erdberg | 425/133.5 |
| 3,611,492 | 10/1971 | Scheibling | 425/133.5 |
| 3,694,119 | 9/1972 | Scheibling | 425/133.5 |
| 4,221,836 | 9/1980 | Rutledge et al. | 264/171 |
| 4,477,521 | 10/1984 | Lehmann et al. | 264/171 |

FOREIGN PATENT DOCUMENTS

| | | | |
|---|---|---|---|
| 55-109643 | 8/1980 | Japan | 264/171 |
| 2028228A | 3/1980 | United Kingdom | 264/171 |
| 2137935A | 10/1984 | United Kingdom | 264/171 |

*Primary Examiner*—Jeffery Thurlow
*Attorney, Agent, or Firm*—McGlew and Tuttle

[57] ABSTRACT

A method for the production of laminates comprises extruding a support of acrylic nitrile-butadiene-styrene (ABS) and a coating of polymethyl methacrylate (PMMA, acrylic glass) through a sheet die. The acrylic glass forming the coating has a melt flow index of at most 2.0 (MFI 230° C./3.8 according to DIN 53735) and the ABS forming the support are conducted directly to the die through different channels.

2 Claims, 2 Drawing Figures

METHOD OF PRODUCING COMPOSITE BOARDS OR LAMINATES

FIELD AND BACKGROUND OF THE INVENTION

This invention relates in general to extrusion devices and methods and in particular to a new and useful method of producing composite laminates wherein both a support and a coating are extruded through a sheet die after they are conducted separately to the die through different channels.

The invention relates to a method of producing composite boards or laminates where a support of acrylic nitrile-butadiene-styrene (ABS) and a coating of polymethyl methacrylate (PMMA, acylic glass) are coextruded through a sheet die.

To the extent that such methods have become known until now, the materials to be combined were first extruded, then brought together in an adapter and bonded, and only then extruded jointly through a sheet die. This presents no difficulties as long as the materials to be joined have comparable viscosities at a given temperature. This is the case for the material pair ABS/acrylic glass for example when the melt flow index MFI 230° C./3.8, measured according to DIN 53735, has a value of about 6.

A study of the life of bathtubs which had been produced by deep-drawing of plates made in conventional manner showed that after about 500 hot-cold water cycles the first hair fissures became visible in the acrylic glass surface. This value is sufficient for only modest requirements, and the problem arose to substantially increase the number of alternate hot and cold water fillings to which a tub could be subjected without visible damage.

SUMMARY OF THE INVENTION

Surprisingly it was found that the essential prerequisite for reaching the set goal is the use of acrylic glass with a relatively low melt flow index.

The found solution was not obvious from the start for the reason that acrylic glass types suitable for coextrusion with ABS differ only slightly in their known mechanical properties, that is, in bending strength, tensile strength, impact resistance, ball pressure hardness and scratch hardness, even when the melt flow index MFI is greatly different. Therefore, there was no cause at all to seek an improvement of the life of bathtubs by changing over to acrylic glass types with a lower melt flow index MFI. Such attempts, moveover, were faced with the fear that the coextrusion of acrylic glasses of low melt flow index and ABS by conventional methods is not possible. To be able to carry out the necessary experiments, therefore, a way had to be found first for coextruding the substance pairs of interest, and for this, in the end, the use of a multi-channel die was found to be usable. The experiments performed indicated, surprisingly, that with a reduction of the melt fow index below a value of about 2 a sudden rise in the life of bathtubs made from these lamiantes can be achieved. The solution of the problem on which the invention is based thus resides in that the acrylic glass forming the coating has a melt flow index MFI 230° C./3.8 according to DIN 53735 of an most 2.0 and that the acrylic glass and the ABS forming the support conducted directly to the die through different channels.

Accordingly, it is an object of the invention to provide a sheet die which includes upper and lower lip portions of a sheet forming a die with a plurality of upper layer conductive passages formed on the sheet die which converge to the die along with a plurality of lower material passages so that they form laminates at the die through which they are extruded.

A further object of the invention is to provide a method for the production of laminate where a support and a coating are coextruded through a sheet die after they are conducted direct to the die through different channels.

A further object of the invention is to provide a method wherein the support of acrylic nitrile-butadiene-styrene and a coating of polymethyl methacrylate are extruded through a sheet die by directing them through separate channels to the die.

A further object of the invention is to provide a sheet die which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which perferred embodiments of the invention are illustrated.

DESCRIPTION OF THE PREFERRED EMBODIMENTS

Figure 1:
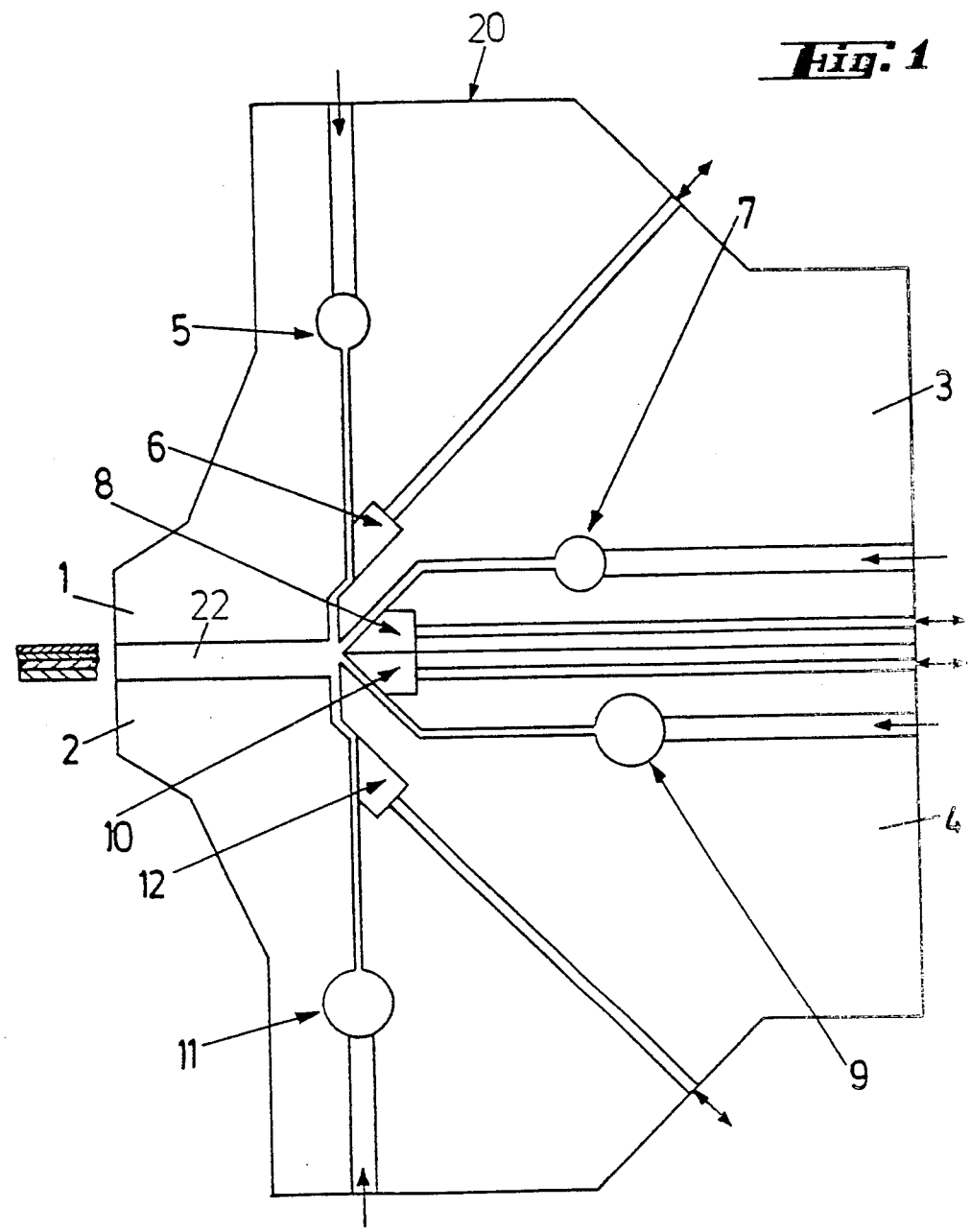
FIG. 1 is a schematic sectional view of a sheet die constructed in accordance with the invention.

Referring to the drawings in particular the invention embodied therein comprises a sheet die generally designated 20 which is shown as having a central die channel 22 which is in communication with a plurality of upper layer distribution channel such as a distribution channel 5 in an upper die body 3 and a lower distribution channel 9 in a lower die body 4.

The apparatus illustrated in FIG. 1 is a so-called multi-channel die device. Typical for this is that the material which is to form one layer of a laminate is first fixed as to width and thickness and is bonded with other such layers only in the immediate region of the extrusion die channel 22. The customery procedure, on the contrary, is to bring the individual layers of different plastics together already before the die and to extrude them jointly through the latter.

The schematically shown essential parts of the apparatus according to FIG. 1 are upper lip 1 and lower lip 2 of a sheet die as well as an upper die body 3 and a lower die body 4, in which a number of distributor channels are arranged. In the illustrated case a laminate is made of four layers, a cover layer, an upper intermediate layer, a lower intermediate layer, and a support layer, which are formed in this order in the distributor channel 5, 7, 9 and 11. The material forming a layer is supplied through a connection, brought in the interior of the die body approximately to the width of the laminate, and determined as to its thickness by a backpressure bar extending over the width of the individually supplied material webs. The distributor channels 5, 7, 9 and 11 are correlated with the backpressure bars 6, 8, 10 and 12 in this order.

Essential to the invention is the feature that the partial webs produced in the individual distributor channels are brought together only directly at the entrance to the die, which consists of the upper lip 1 and lower lip 2, owing to which their different rheological behavior remains with adverse effect.

The differences in the rheological behavior of the individual materials used for the production of laminates for the formation of bathtubs are considerable in particular when on a base of one or more layers of ABS a coating of acrylic glass is to be applied, the acrylic glass having a relatively low melt flow index. For such a pairing of substances coextrusion in the form of wide and thick panels is reasonably possible only if the layer construction is fixed by the action of solid outer walls, namely the walls of the sheet die immediately after the layers have been brought together. What advantage, on the other hand, is offered by the use of acrylic glass of low melt flow index can be seen from FIG. 2. The ordinate in this diagram is the number of filling cycles with hot and cold water to which a bathtub according to the pertinent CEN specifications can be subjected before the first fine hair fissures appear. In such a test, the bathtub is filled alternately with hot water of 95° C. and cold water of 12° C., the test conditions being strictly specified.

Figure 2:
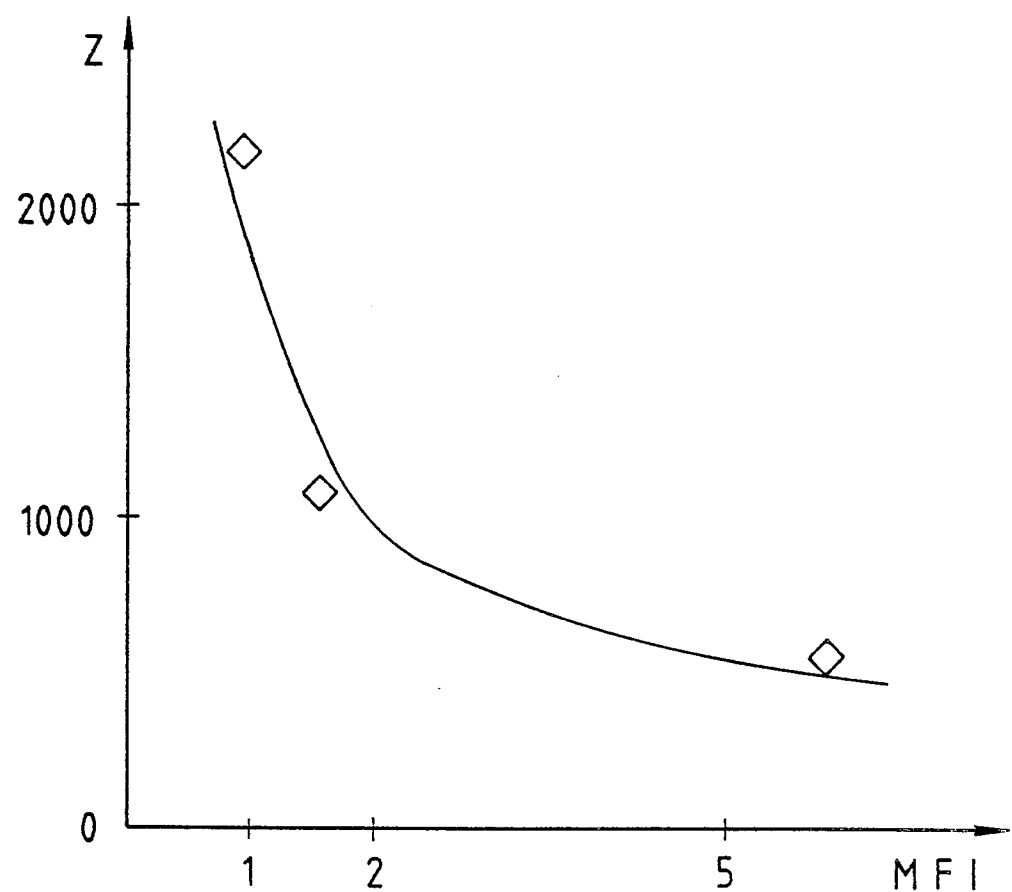
FIG. 2 is a diagram indicating the durability of bathtubs in dependence on the melt flow index of the acrylic glass uses in their construction thereof.

The surprising thing in the diagram shown in FIG. 2 is that the resistance of bathtubs to periodically alternating hot-cold loads increases conspicuously when the melt flow index of the acrylic glass cover layer applied on the ABS support layer falls below 2, the optimum value, with respect to fabrication being still possible without a problem, being approximately 1. The melt flow index is determined according to the standard DIN 53735; it indicates that mass of a sample which is pressed through a die in a certain time under defined conditions. In the present case the melt flow index MFI 230° C./3.8 was determined, which means that the temperature of the testing equipment was 230° C. and the tested material was under the load of a mass of 3.80±0.02kg.

As has been mentioned, the strong dependence of the resistance of a bathtub to alternate charges of cold and hot water on the melt flow index, of all things, is surprising inasmuch as the usual mechanical characteristics of the material show no such dependence. While specific embodiments of the invention have been shown and described in detail to illustrate the application of the principles of the invention, it will be understood that the invention may be embodied otherwise without departing from such principles.

What is claimed is:

1. A method for the production of bath tub inserts for a deep-drawing process comprising coextruding a support of acrylic nitrile-butadiene-styrene and a coating of polymethyl methacrylate which is on the support, through a sheet die, while forming a coating of acrylic glass over the support which has a melt flow index of at most 2.0 (MFI 230° C./318) according to DIN 53735 by conducting the coating and the support directly to the die through different channels so as to form panels, producing bathtub inserts by a deep-drawing.

2. A method according to claim 1, wherein the melt flow index of the acrylic glass is about 1.

* * * * *